United States Patent [19]

Zimmerli

[11] 4,046,734

[45] Sept. 6, 1977

[54] PROCESS FOR THE MANUFACTURE OF AMINOPLAST AND PHENOPLAST MOULDING COMPOSITIONS USING A THIN LAYER EVAPORATOR OR A ROLLER DRIER

[75] Inventor: Willi Zimmerli, Ollon, Switzerland

[73] Assignee: Ciba-Geigy Corporation, Ardsley, N.Y.

[21] Appl. No.: 521,106

[22] Filed: Nov. 5, 1974

[30] Foreign Application Priority Data

Nov. 5, 1973  Switzerland ................. 15560/73

[51] Int. Cl.² ............................................. C08J 3/14
[52] U.S. Cl. ................................... 260/38; 260/39 R
[58] Field of Search ............... 260/39 R, 29.4 R, 38, 260/29.3

[56] References Cited

U.S. PATENT DOCUMENTS

| | | | |
|---|---|---|---|
| 2,101,635 | 12/1937 | Bender | 260/38 X |
| 2,810,700 | 10/1957 | Bornstein | 260/17.3 |
| 3,376,239 | 4/1968 | Pfeiffer | 260/39 R |
| 3,398,012 | 8/1968 | Parkes et al. | 260/38 X |
| 3,759,687 | 9/1973 | Nobell | 260/29.4 R |
| 3,786,041 | 1/1974 | Talsma | 260/39 R |
| 3,793,302 | 2/1974 | Berstein et al. | 260/39 R |

FOREIGN PATENT DOCUMENTS 1,227,493  4/1971  United Kingdom

OTHER PUBLICATIONS

H. R. Simonds, ed., *Encyclopedia of Plastics Equipment*, (1964) pp. 161-162.

*Primary Examiner*—Sandra M. Person
*Attorney, Agent, or Firm*—Luther A. R. Hall

[57] ABSTRACT

Aminoplast or phenoplast compositions are manufactured by drying an aqueous solution of a phenol-formaldehyde resin, a urea-formaldehyde resin or an optionally phenol-modified melamine-formaldehyde resin in a thin layer evaporator or roller drier. The compositions are used for the manufacture of crockery, household articles and technical components for the electrical industry.

6 Claims, No Drawings

PROCESS FOR THE MANUFACTURE OF AMINOPLAST AND PHENOPLAST MOULDING COMPOSITIONS USING A THIN LAYER EVAPORATOR OR A ROLLER DRIER

Urea, melamine, phenolic and melamine-phenol moulding compositions have been marketed for a considerable time and have, because of their good properties, gained a considerable share of the market. They are used for the manufacture of crockery, household articles and technical components for the electrical industry. They have good mechanical and electrical properties coupled with excellent surface hardness and resistance to liquids customarily found in households, to foodstuffs, to acids and to alkaline media.

There are numerous processes for the manufacture of these moulding compositions.

All the processes are preceded by the batchwise or continuous manufacture of the resin, in which, depending on the nature of the moulding composition, urea, melamine or phenol or melamine-phenol is condensed with formaldehyde in a stirred kettle until the desired resin is produced.

The resin thus manufactured can now be evaporated to dryness and can be mixed with the additives only at this stage (dry process) or can, as is also customary, be kneaded direct, as an aqueous solution, with the cellulose and additives, and then be dried (wet process).

The premixes thus manufactured still require to be homogenised and pigmented, and this is carried out in comminuting homogenising equipment or in ball mills. After this procedure, the product is in principle already the finished moulding composition, but in the form of a dust. It is known that products in the form of a dust tend to bridging and for this reason do not ensure continuous feed in automatic processes. Therefore, the moulding compositions obtained in the form of a dust are additionally densified, and this can be carried out cold or warm depending on the type in question. Tabletting presses or roller densifiers are suitable for cold densification. More recently, hot densifiers appear to be gaining increasing acceptance. The products are fed into heated extruder screws where, following the homogenisation and compacting process, the moulding compositions obtained are granulated whilst still hot and without producing dust. If necessary, this stage is followed by a fractionation or dust-removing process.

The wet process offers the advantage that an intimate mixture with cellulose can be achieved. In the dry process, this premixing is admittedly cheaper, but only gives an equally good mixture if high intensity mixers are used.

These known processes suffer from the disadvantage that because of the long times for which the product is exposed to higher temperatures, for example in the drier or kneader, the degree of condensation varies and is no longer sufficiently reproducible in the light of the high standards which are nowadays demanded of the processing of moulding compositions, and of the cured products.

A process described in German Offenlegungsschrift No. 2,163,506 seeks to remedy this shortcoming by passing the pulverulent mixture of the starting materials, namely resin, fillers and optionally further additives, continuously and in a constant thickness of layer through a heating zone, in the course of which the desired deree of condensation is arrived at. As a result, the entire process has one more working stage and is correspondingly more expensive. The danger of soiling of the product, especially products of light colour, increases with each additional stage.

The process according to the invention, in which the dried, ground resins, mixed with fillers, pigments, lubricants and optionally other additives, are densified warm and transferred into an extruder, or cooled and ground, overcomes these disadvantages. It is characterised in that an aqueous solution, which optionally contains fillers, of a phenol-formaldehyde resin, a urea-formaldehyde resin or a melamine-formaldehyde resin, which can also be modified with phenol (melamine-phenol resin) is passed, optionally after addition of pigments, into a thin layer evaporator or roller drier, in which the water is distilled off at an elevated temperature, after which the dried material, in the fused or solid form, and preferably containing at least 92% of resin, is drawn off and cooled.

Thin layer evaporators and roller driers are generally known. For example, thin layer evaporators are described in the journal "Chemical and Process Engineering" of November 1970 or in "Fette, Seifen, Anstrichmittel" 72, 1066–1070 (1970).

In detail, the following procedure can be adopted in carrying out the process according to the invention:

The condensation of the phenol, urea, melamine or melamine modified with phenol, that is to say melamine-phenol, with formaldehyde is carried out in a condensation kettle in the usual manner, in aqueous solution in the presence of catalysts, such as acids or bases. The desired precondensates are obtained by controlling the ratios of the materials, the reaction temperature, which is usually between 70° and 90° C, and the time, which is usually a few hours. Condensates which have a water compatibility of 1.0 : 1.2 to 1.0 : 3.5 are desired as a rule. By water compatibility there is understood the ratio of the amount of resin to the amount of water, at which the resin just still gives a solution free from turbidity. Resin solutions of approximately 50% strength are particularly suitable. More dilute solutions can suitably be concentrated to the optimum concentration before they are fed into the thin layer evaporator. Pigments or mineral substances can also already be mixed into the resin syrup.

The resin syrup is now pumped continuously into the thin layer evaporator. Depending on the type of the latter, it is heated, for example, to a temperature above the melting point of the resin, usually to 150°–220° C, which is achievable with hot steam under 9 atmospheres gauge pressure. The water of the resin solution distils off under normal pressure. A melt with a resin content of at least 92%, and normally 95 – 97%, issues at a temperature of about 140° – 150° C. Other thin layer evaporators operate below the melting point and thus expel the dried material in the solid state, for example as a powder. It is also possible to add a part, or all, of the fillers already at the stage of the resin solution, though this only applies to mineral fillers, since cellulose would swell undesirably.

When using a roller drier, a corresponding similar procedure is followed.

The material is cooled on a cooling roller, flaked, ground and mixed with fillers, pigments, lubricants and optionally other additives.

Possible fillers are cellulose powder, wood flour and mineral powders such as asbestos flour, glass powder, kaolin, barium sulphate, calcium carbonate and magnesium oxide whilst possible pigments are lithopone, titanium dioxide and organic coloured pigments and possible lubricants are magnesium stearate or zinc stearate or waxes.

The pulverulent mixture is now densified warm.

Warm densification apparatuses which can be used are above all single-screw extruders or twin-screw extruders. The heat required for the melting process is in most cases generated by friction.

The lumps obtained after the warm densification can be passed into an extruder, briefly plasticised and granulated by passing through a perforated die. These granules are above all used as injection moulding compositions. The warm-densified product can also be cooled, crushed and ground, after which it can be used as a compression moulding composition.

The moulding compositions thus obtained give mouldings which are very resistant to crack formation and which in particular also show no cracks around the position of the sprue even after annealing. The mouldings are largely free from strains and distortion. The manufacturing process can be carried out in one pass and is shorter and more economical than the known processes. It ensures very good reproducibility of the moulding compositions. The uniform degree of condensation of the resins, which is of importance in adjusting the flow of the material, can be retained to the desired degree in the finished moulding composition.

It is surprising that the process according to the invention can be carried out in such a trouble-free and economical manner. Rather, it might have been expected that in the outlet from the evaporator, build-up in layers, and therefore blockages, would be unavoidable.

The process is suitable for phenoplast resins and for all aminoplast resins. The residence time in the thin layer evaporator is preferably a few seconds and the temperature is preferably 140°-150° C.

All stages of the process according to the invention are distinguished, compared to the conventional processes, by the fact that they treat the sensitive resin gently. In the course of the thin layer evaporation, or the drying on the roller drier, the resin only undergoes slight further condensation — and does so with excellent reproducibility — because of the extremely short residence time.

The degree of condensation of the finished moulding composition can be kept constant with a hitherto unattainable precision and can be determined by the degree of condensation of the original resin solution without having to introduce an additional special process step for this purpose.

EXAMPLE 1 a. In a stirred kettle, 1.39 tons of 36.5 percent strength by weight (= 40 percent strength by volume) aqueous formaldehyde solution are adjusted to a pH value of 9.2 with sodium hydroxide solution and diluted with water, and 1.33 tons of melamine are added at 70° C. The condensation is carried out at 90° C and is followed by determining the compatibility of the solution with water. When a degree of condensation with a compatibility with water of 1:3.5 (resin to water) is reached, the solution is cooled to room temperature.

b. The clear 52% strength resin solution is fed continuously, at a throughput of 108 kg/hour, to a thin layer evaporator of 0.5 m² heating surface, which is heated with steam at 190° C. The water distils off under normal pressure.

The resin melt (60 kg/hour) which issues from the thin layer evaporator and has a residual moisture content of approx. 5% is cooled on a flaker roller, crushed and ground.

65 parts of the pulverulent resin are mixed homogeneously, in a high speed intensive mixer, with 24 parts of cellulose powder, 10 parts of $BaSO_4$, 0.1 part of zinc stearate, catalysts and pigments, and the mixture is warm-densified continuously in a twin-screw extruder. The lumps are extruded through a perforated die by means of a subsequent extruder, and the extrudate is cut by means of a face cutter into particles of about 4 mm diameter and the same length. The warm-densified moulding composition thus obtained has excellent processing properties when used for injection moulding, even with a pin gate. Strain-free and crack-resistant mouldings are obtained.

EXAMPLE 1 a. 400 kg of 37% strength aqueous formaldehyde solution, 39 kg of 80% strength phenol, 250 kg of melamine and 1.3 liters of 30% strength sodium hydroxide solution are warmed to 95° C in an 800 liters stirred kettle equipped with an anchor stirrer. Condensation of the solution is continued at this temperature until the desired degree of condensation (compare Example 1) is reached; thereafter the solution is cooled rapidly.

b. The melamine-phenol/formaldehyde resin solution is pumped, at a throughput of 125 kg/hour, into a thin layer evaporator of 0.5 m² heating surface, the jacket of which evaporator is kept at 181° - 191° C by means of steam. 43 - 55 kg/hour of water distil off under normal pressure.

The resin melt issuing at the rate of 73 kg/hour has a residual moisture content of 5% (determined by heating to 105° C for 4 hours). It is converted to flakes on a flaker roller and then ground.

The dry resin is mixed with cellulose powder, lithopone, zinc stearate and pigments in an intensive mixer and is then warm-densified in a twin-screw extruder. The lumps are extruded through a perforated die by means of a subsequent extruder, and cut with a face cutter. The resulting dust-free moulding composition, in the form of regular particles about 4 mm in size, is above all very suitable for processing by injection moulding. Strain-free mouldings with excellent resistance to cracking can be manufactured, even with a pin gate.

EXAMPLE 3 a. 4 kg of magnesium carbonate and 246 liters of concentrated ammonia solution are added to 2,710 kg of a 36.5 percent strength by weight aqueous formaldehyde solution (40 percent strength by volume) in a stirred kettle of 4,000 liters capacity. 1,280 kg of urea are added whilst warming the mixture to 46° C. The exothermic reaction is then so controlled, by cooling, that the maximum temperature does not exceed 55° C. After reaching the desired degree of condensation (compare Example 1), the mixture is cooled to 30°-35° C. The resulting UF resin solution is stable for several days.

b. The resin solution is pumped, at a throughput of 80 kg/hour, into a thin layer evaporator which is heated to 190° C, and of which the rotor runs at 960 revolutions per minute. Under normal pressure, 40 - 42 kg of water distil off per hour.

35 – 37 kg of UF resin melt, with a residual moisture content of 3 – 5%, flow hourly onto a flaker roller and are converted into flakes and then ground. The dry resin is mixed with cellulose powder, zinc oxide, zinc stearate and lithopone in an intensive mixer. This premix, which already is very homogeneous, is subsequently warm-densified continuously in an extruder and hot-granulated using a perforated die and face cutter. A dust-free UF moulding composition in the form of very regular particles of 4 mm diameter is produced. It gives good strain-free and crack-resistant mouldings and is particularly suitable for processing by injection moulding.

EXAMPLE 4 a. A MF resin solution is prepared as described under 1a of Example 1.

b. The clear 52% strength resin solution is fed continuously, at a throughput of 102 kg/hour, to a roller drier of 1.2 m$^2$ exchange surface. The water evaporates off under normal pressure.

The resin melt issuing from the roller drier (57 kg/hour), which has a residual moisture content of approx. 6%, is cooled on a flaker roller, crushed and ground.

The further processing is carried out as described in Example 1, and gives a product with similar properties.

EXAMPLE 5 a. A MPF resin solution is prepared as described under 2a of Example 2.

b. The melamine-phenol-formaldehyde resin solution is fed continuously, at a throughput of 111 kg/hour, to a roller drier of 1.2 m$^2$ heating surface. The water evaporates off under normal pressure and is condensed in a condenser.

The resin melt which issues from the roller drier (61 kg/hour), has a residual moisture content of 5-7% (determined by heating to 105° C for 4 hours). It is flaked on a flaker roller and is subsequently ground.

The dry resin is further processed as in Example 2, and gives mouldings with similar properties.

EXAMPLE 6 a. A UF resin solution is prepared as described under 3a of Example 3.

b. The resin solution is fed continuously, at a throughput of 80 kg/hour, to a roller drier of 1.2 m$^2$ heating surface. The water evaporates off under normal pressure and is condensed in a condenser.

The further processing is carried out as described in Example 3. Mouldings with similar properties are obtained.

What is claimed is:

1. An improved process for the manufacture of aminoplast or phenoplast compositions by drying an aqueous solution, which optionally contains pigments or mineral fillers, of a phenol-formaldehyde resin, a urea-formaldehyde resin, a melamine-formaldehyde resin or a phenol-modified melamine-formaldehyde resin, grinding the resin composition, optionally mixing it with a filler, pigment, lubricant and, if desired, other additives, and warm-densifying the mixture wherein the improvement comprises passing the aqueous resin solution into a thin layer evaporator or roller drier, distilling off the water at an elevated temperature, and withdrawing the dried material in a fused or solid form.

2. A process according to claim 1 wherein the dried material in a fused or solid form comprises from 92 to 97% resin.

3. A process according to claim 1, characterised in that the thin layer evaporator or the roller drier is at a temperature of 150° – 220° C.

4. A process according to claim 1, characterised in that an aqueous solution with a resin content of about 50% is passed into the thin layer evaporator or the roller drier.

5. A process according to claim 1, characterised in that mineral fillers are admixed to the resin solution and the mixture is dried and ground.

6. A process according to claim 1, characterised in that the warm-densified mixture is cooled and ground.

* * * * *